United States Patent [19]
Walter et al.

[11] Patent Number: 5,314,744
[45] Date of Patent: * May 24, 1994

[54] DOUBLE COATED FREE AGGREGATE USABLE IN WOOD CONCRETE TECHNOLOGY AND METHOD OF MAKING THE SAME

[75] Inventors: Hansruedi Walter; Leni M. Walter-Gurzeler, both of Windsor, S.C.

[73] Assignee: Insul Holz-Beton Systems Inc., Windsor, S.C.

[*] Notice: The portion of the term of this patent subsequent to May 28, 2008 has been disclaimed.

[21] Appl. No.: 791,272

[22] Filed: Nov. 13, 1991

[51] Int. Cl.$^5$ .................................................. B32B 5/16
[52] U.S. Cl. .................................... 428/326; 106/805; 428/403; 428/404
[58] Field of Search ....................... 428/403, 404, 326; 106/805; 501/144

[56] References Cited

U.S. PATENT DOCUMENTS

| | | | |
|---|---|---|---|
| 1,571,048 | 1/1926 | Garrow | 106/805 |
| 3,393,261 | 7/1968 | Herzig et al. | 264/82 |
| 3,492,385 | 1/1970 | Simunic | 264/82 |
| 4,325,457 | 4/1982 | Docherty et al. | 181/210 |

FOREIGN PATENT DOCUMENTS 1194854  11/1985  U.S.S.R. ............................. 428/403

*Primary Examiner*—Paul J. Thibodeau
*Assistant Examiner*—H. Thi Le
*Attorney, Agent, or Firm*—Oblon, Spivak, McClelland, Maier & Neustadt

[57] ABSTRACT

A free aggregate usable in forming wood concrete products is formed by a process including the encasing of a free aggregate of individual chips with an inorganic mineralizing coating to a degree sufficient to seal in water-soluble organic matter held in pores of the chips, while maintaining the individual chips in a free aggregate form. The encased chips are then seasoned for 15 to 25 days and again coated with a second mineralizing coating.

3 Claims, No Drawings

DOUBLE COATED FREE AGGREGATE USABLE IN WOOD CONCRETE TECHNOLOGY AND METHOD OF MAKING THE SAME

BACKGROUND OF THE INVENTION

1. Field of the Invention

The present invention is directed to a stable free aggregate of mineralized wood chips usable in wood concrete products, and a method of making the same.

2. Description of the Related Art

In wood concrete technology (WCT) fibrous organic materials such as wood chips (and hereinafter simply referred to as chips) are used as an aggregate in concrete. This technology is advantageous for sound and heat insulation since the wood chips have a low density. However, until recently, WCT has not been used in the U.S. because most of the industrial timber is grown in the southern and southeastern part of the U.S., and is not suitable for WTC. This is due in part to the fact that such woods, such as Southern Pine, contain substantial amounts of "cement poisons" which leach from the organic fibers aggregate into the cement mixture, and retard the hardening of the cement such that hardening times are unacceptable.

Applicants have previously developed a process known as K-X treatment for treating organic products WTC. The K-X treatment process includes forming a free aggregate of chips of fibrous organic products and encasing the individual chips with an inorganic mineralizing coating to a degree sufficient to seal in water-soluble organic matter, i.e., the cement poisons, held in the pores of the chips. This prevents the leaching of the cement poisons the individual chips when they are subsequently incorporated into a cement mixture. The resulting stable free aggregate can be stored without decaying and permits a relatively fast hardening time for the concrete (as little as 10 to 14 hours). The K-X treatment is disclosed in Applicants' U.S. Pat. No. 5,109,170, which is herein incorporated by reference.

However, while the K-X treatment represents a substantial improvement over the conventional WCT, its 10 to 14 hour hardening time is not entirely satisfactory. It would be desirable to instead produce an aggregate for WCT which can be used in concrete products having an even shorter hardening time.

SUMMARY OF THE INVENTION

It is therefore an object of the present invention to provide a process for producing a mineralized free aggregate usable in wood concrete technology, which can be combined with cement to produce a wood concrete product which drys or hardens in a short time.

It is a further object of the present invention to provide a process for producing such an aggregate.

According to one feature of the invention, the above and other objects are achieved by a free aggregate usable in forming wood concrete products and comprising a plurality of at least partially degassed, individual chips of fibrous organic material. The chips are coated with first and second coatings of an inorganic mineralizing coating encasing the individual chips to a degree sufficient to seal in water-soluble organic matter held in the pores of the chips, while maintaining the individual chips in a free aggregate form.

According to another feature of the invention, the above and other objects are achieved by a process for producing a coated free aggregate usable in forming wood concrete products, comprising the steps of forming a free aggregate of chips of fibrous organic products, and encasing the individual chips with a first inorganic mineralizing coating to a degree sufficient to seal in water-soluble organic matter held in pores of the chips while maintaining the individual chips in a free aggregate form, followed by seasoning the chips to permit degassing of volatile oils held in the pores of the chips while still maintaining the individual chips in a free aggregate form, and encasing the individual chips with a second inorganic mineralizing coating.

DESCRIPTION OF THE INVENTION

Applicants have determined that while the K-X process seals in water-soluble cement poisons, volatile oils in the pores of the chips can still escape in gaseous form. These escaping gasses from the volatile oils poison the cement and increase the curing time of the cement beyond that where an entirely inorganic aggregate is used. The present invention therefore provides for the degassing and resealing of the aggregate.

According to the invention, also called a K-XX treatment, chips are first treated in a first coating process (preferably using kaolin as the inorganic coating material), as disclosed in U.S. Pat. No. 5,019,170, to produce a K-X aggregate. The K-X aggregate of pinchips (or other sturdy, plant derived fibers) is then seasoned or cured for at least 15 days (if the weather is dry) up to about 25 days (if the weather is humid) in a building where the roof protects the aggregate from rain. The sides of the building should be open, so that the material can breathe and the volatile oils in the pores of the chips can escape. During this seasoning period, the aggregate is maintained in large piles of no more than 100 cubic yards. The piles are turned over three to four times, at regular intervals, during the curing treatment. The piles should not be more than two feet high.

After the aggregate has cured in the piles, it is conveyed to a mixer where it is encased in a second inorganic (kaolin) emulsion layer, thereby producing a double impregnation of the aggregate, and forming the K-XX aggregate. The second coating step can be identical to the first (kaolin) coating step disclosed in U.S. Pat. No. 5,019,170.

Subsequently, the aggregate can be mixed with standard Portland cement and water as bonding agents to produce a K-XX wood concrete mixture which can be used in processes where panels, formed products and boards will be manufactured, with equipment where the normally used aggregate is concrete, or as the particles in particle board and plywood or in combinations of wood fibers and glues (pulp). The K-XX wood concrete mixture will harden overnight.

The K-XX concrete mixture can be stressed by heat, high vibration and mechanical pressure, as is common in the processes to manufacture panels and posts to be assembled in sound barrier walls, outdoor partitions, building panels, wall forms, slab forms, roof tiles and paving units, with already existing stationary equipment. The rapid hardening time for the mixture allows a high-speed production output, so that no special wood concrete equipment or large floor space is necessary.

For example, the stationary equipment can mold the product on a mobile palette, in which the product has a length of 8 feet in the case of a highway sound barrier; the product can be as thin as only 1 inch in the case of roof tiles. The fresh cake of wood concrete product, though still green, remains firm on the palette and can be conveyed immediately after being molded to a rack, and later moved to a kiln room where a prehardening phase with moist warm air permits the product to be handled in the morning of the day following casting.

These panels are more satisfactory for sound or heat insulation than are conventional panels using inorganic aggregate, since the particles remains fibrous in their interiors and so have low densities.

In the particle and plywood industry, the K-XX mineralization produces a non-toxic, non-decayable aggregate which does not require treatment with the usual protective chemicals before being glued. The K-XX treatment is preferably used with a cement/water solution as the bonding agent to manufacture non-combustible fiberboard products. In the plywood industry, the critical formaldehyde treatment may be eliminated.

As a result of the double mineralization of the pinchips due to the K-XX treatment, many more products, requiring greater strength and stress resistance during the production and hardening phase, are feasible in WCT. The K-XX treated aggregate is environmentally sound and is the only wood concrete product usable in a sound barrier system with epoxy coated steel rebars, without the need for reinforced concrete as a second layer in a two laminae design, thereby reducing cost and production complexity.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A free aggregate usable in forming wood concrete products, comprising:
   a plurality of individual chips of fibrous organic material, wherein at least a portion of volatile oils in the pores of the chips have been allowed to evaporate; and
   a two layer kaolin mineralizing coating encasing the individual chips to a degree sufficient to seal in water-soluble organic matter held in the pores of said chips and prevent the leaching thereof, while maintaining said individual chips in a free aggregate form.

2. The free aggregate of claim 1 wherein said chips comprise wood pinchips.

3. The free aggregate of claim 1, wherein said fibrous organic matter is derived from plant matter.

* * * * *